(12) United States Patent
Kono

(10) Patent No.: US 10,018,899 B2
(45) Date of Patent: Jul. 10, 2018

(54) DISCHARGE LAMP DRIVER, LIGHT SOURCE APPARATUS, PROJECTOR, AND DISCHARGE LAMP DRIVING METHOD

(71) Applicant: SEIKO EPSON CORPORATION, Tokyo (JP)

(72) Inventor: Masaru Kono, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/656,225

(22) Filed: Jul. 21, 2017

(65) Prior Publication Data
US 2018/0035522 A1 Feb. 1, 2018

(30) Foreign Application Priority Data

Aug. 1, 2016 (JP) ................................ 2016-151220

(51) Int. Cl.
| | | |
|---|---|---|
| *G03B 21/20* | (2006.01) | |
| *H05B 41/288* | (2006.01) | |
| *H05B 41/392* | (2006.01) | |
| *G03B 21/00* | (2006.01) | |
| *G03B 33/12* | (2006.01) | |
| *H04N 9/31* | (2006.01) | |

(52) U.S. Cl.
CPC ....... *G03B 21/2026* (2013.01); *G03B 21/208* (2013.01); *G03B 21/2053* (2013.01); *H05B 41/2887* (2013.01); *H05B 41/3928* (2013.01); *G03B 21/006* (2013.01); *G03B 33/12* (2013.01); *H04N 9/3105* (2013.01); *H04N 9/3155* (2013.01)

(58) Field of Classification Search
CPC ............ G03B 21/2026; G03B 21/2053; G03B 21/006; G03B 21/208; G03B 33/12; H05B 41/2887; H05B 41/3928; H04N 9/3105; H04N 9/3155
See application file for complete search history.

(56) References Cited

U.S. PATENT DOCUMENTS

| | | | |
|---|---|---|---|
| 6,815,907 B2 | 11/2004 | Riederer | |
| 8,378,581 B2 | 2/2013 | Terashima | |
| (Continued) | | | |

FOREIGN PATENT DOCUMENTS

| | | |
|---|---|---|
| JP | 4436605 B2 | 3/2010 |
| JP | 2011-028943 A | 2/2011 |
| JP | 2011-124184 A | 6/2011 |

*Primary Examiner* — Sultan Chowdhury
*Assistant Examiner* — Magda Cruz
(74) *Attorney, Agent, or Firm* — Oliff PLC

(57) ABSTRACT

A discharge lamp driver includes a discharge lamp driving unit configured to supply drive current to a discharge lamp and a control unit configured to control the discharge lamp driving unit. The drive current has a modulation drive period in which a first period in which AC current having a frequency higher than 1 kHz is supplied and a second period in which DC current is supplied are alternately repeated. In the modulation drive period, the control unit periodically changes length of a first DC period included in the second periods and in which DC current of a first polarity is supplied, and length of a second DC period included in the second periods and in which DC current of a second polarity is supplied, and increases one of the length of the first DC period and the length of the second DC period while decrease the other one.

20 Claims, 10 Drawing Sheets

(56) References Cited

U.S. PATENT DOCUMENTS

| | | |
|---|---|---|
| 8,513,893 B2 | 8/2013 | Ono et al. |
| 2002/0105284 A1* | 8/2002 | Urakabe ............ H05B 41/2883 |
| | | 315/276 |
| 2003/0001518 A1 | 1/2003 | Riederer |
| 2005/0264237 A1* | 12/2005 | Ishizuka ............ H05B 41/2886 |
| | | 315/209 R |
| 2011/0018456 A1* | 1/2011 | Terashima ......... H05B 41/2928 |
| | | 315/246 |
| 2012/0074858 A1 | 3/2012 | Ono et al. |

* cited by examiner

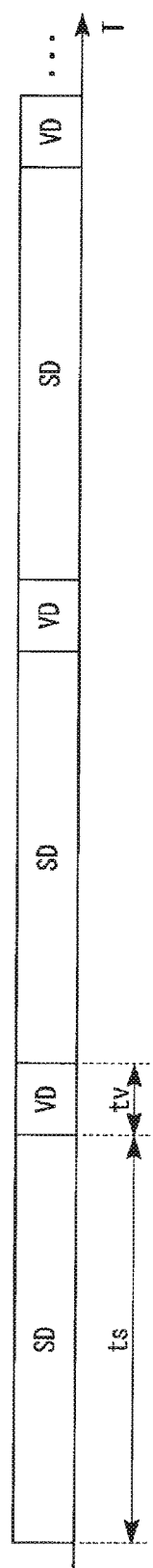

DISCHARGE LAMP DRIVER, LIGHT SOURCE APPARATUS, PROJECTOR, AND DISCHARGE LAMP DRIVING METHOD

BACKGROUND

1. Technical Field

The present invention relates to a discharge lamp driver, a light source apparatus, a projector, and a discharge lamp driving method.

2. Related Art

For example, JP-A-2011-124184 describes a configuration in which the frequency of AC current supplied to a high-pressure discharge lamp is switched from a first frequency to a second frequency higher than the first frequency and vice versa. In JP-A-2011-124184, a period for which the AC current having the first frequency is supplied to the high-pressure discharge lamp over half the cycle of the AC current having the first frequency is provided to suppress wastage of a front end portion of the electrodes.

Simply supplying the high-pressure discharge lamp with the AC current having the first frequency over half the cycle of the AC current having the first frequency, however, causes in some cases a protrusion formed at the front end of each of the electrodes to be so shaped that the front end of the protrusion is flattened. The discharge position between the electrodes therefore moves (hereinafter referred to as arc jump), resulting in unstable shapes of the electrodes, and the electrodes therefore tend to wear. As a result, the life of the high-pressure discharge lamp cannot be sufficiently improved in some cases.

SUMMARY

An advantage of some aspects of the invention is to provide a discharge lamp driver capable of improving the life of a discharge lamp, a light source apparatus including the discharge lamp driver, and a projector including the light source apparatus. Another advantage of some aspects of the invention is to provide a discharge lamp driving method capable of improving the life of a discharge lamp.

A discharge lamp driver according to an aspect of the invention includes a discharge lamp driving unit configured to supply drive current to a discharge lamp including a first electrode and a second electrode and a control unit configured to control the discharge lamp driving unit. The drive current has a modulation drive period in which a first period and a second period are alternately repeated, the first period in which AC current having a frequency higher than 1 kHz is supplied to the discharge lamp, the second period in which DC current is supplied to the discharge lamp. A polarity of the DC current supplied to the discharge lamp in the second period is inverted whenever the second period is provided. In the modulation drive period, the control unit periodically changes length of a first DC period and length of a second DC period, the first DC period included in a plurality of the second periods and in which DC current of a first polarity is supplied to the discharge lamp, the second DC period included in the plurality of the second periods and in which DC current of second polarity is supplied to the discharge lamp, and increases one of the length of the first DC period and the length of the second DC period while decrease another of the length of the first DC period and, the length of the second DC period.

In the discharge lamp driver according to the aspect of the invention, in the modulation drive period, the control unit increases one of the length of the first DC period and the length of the second DC period but decreases the other one of the length of the first DC period and the length of the second DC period. Therefore, in the modulation drive period, when a protrusion of the first electrode is melted with the length of the first DC period increased, the length of the second DC period is decreased. As a result, the amount of decrease in the temperature of the first electrode in the second DC period can be decreased, whereby the protrusion of the first electrode can be melted in a preferable manner. The protrusion can therefore be likely to grow in a preferable manner.

When the protrusion of the first electrode is allowed to grow with the length of the first DC period decreased, the length of the second DC period is increased. As a result, the amount of decrease in the temperature of the first electrode in the second DC period can be increased, whereby the melted protrusion is allowed to successively solidify in a preferable manner. The protrusion is therefore likely to have a sharply pointing front end, whereby occurrence of arc jump can be suppressed. The same holds true for the second electrode. In the discharge lamp driver according to the aspect of the invention, while the protrusion of the first electrode is melted, a protrusion of the second electrode can be shaped and grown, and while the protrusion of the second electrode is melted, the protrusion of the first electrode can be shaped and grown.

As described above, in the discharge lamp driver according to the aspect of the invention, the first electrode and the second electrode are both allowed to grow in a preferable manner, and the protrusions are readily so shaped as to have preferable sharply pointing front ends. As a result, occurrence of arc jump can be suppressed, and the life of the discharge lamp can be improved.

Further, in the discharge lamp driver according to the aspect of the invention, the first period, in which AC current having a frequency higher than 1 kHz is supplied to the discharge lamp, is provided between the first DC period and the second DC period. The first period therefore serves as a buffer period, whereby the amount of stimulus resulting from a change in thermal load applied to the electrodes can be reduced, as compared with a case where the first DC period is seamlessly switched to the second DC period. The protrusions can therefore be shaped in a more preferable manner.

In the modulation drive period, a unit period containing one first DC period and one second DC period may be repeated, and in the modulation drive period, total length of the length of the first DC period and the length of the second DC period in each unit period may be roughly constant.

According to the configuration described above, in both the case in which the first DC period is increased and the case in which the second DC period is increased, the width of the change in the length of each of the DC periods can be set in the same manner. As a result, the protrusion of the first electrode and the protrusion of the second electrode are both allowed to grow in a satisfactorily balanced manner. Further, since changing a drive current duration ratio in a case where the drive current supplied to the discharge lamp in the second period is considered as AC current allows the length of each of the DC periods to be changed, the control is simplified.

The discharge lamp driver may further include a voltage detector configured to detect inter-electrode voltage of the discharge lamp, and the control unit may change the total length in the modulation drive period in accordance with the detected inter-electrode voltage.

According to the configuration described above, the thermal load applied to the first electrode in the modulation drive period, can be changed in accordance with the degree of degradation of the discharge lamp. The life of the discharge lamp can therefore be further improved.

The control unit may increase the total length in the modulation drive period in accordance with increase of the detected inter-electrode voltage.

According to the configuration described above, the protrusions are allowed to grow in a preferable manner even when the discharge lamp is degraded. The life of the discharge lamp can therefore be further improved.

The control unit may perform a first drive operation in which first drive power is supplied to the discharge lamp and a second drive operation in which second drive power lower than the first drive power is supplied to the discharge lamp and, in the second drive operation, change the total length in the modulation drive period in accordance with the detected inter-electrode voltage.

According to the configuration described above, the above-mentioned effect resulting from a change in thermal load according to the degradation of the discharge lamp can be enhanced.

The discharge lamp driver may further include a voltage detection unit configured to detect inter-electrode voltage of the discharge lamp, and the control unit may change length of the modulation drive period in accordance with the detected inter-electrode voltage.

According to the configuration described above, the thermal load applied to the first electrode in the modulation drive period can be changed in accordance with the degree of degradation of the discharge lamp. The life of the discharge lamp can therefore be further improved.

The control unit may increase the length of the modulation drive period in accordance with increase of the detected inter-electrode voltage.

According to the configuration described above, the protrusions are allowed to grow in a preferable manner even when the discharge lamp is degraded. The life of the discharge lamp can therefore be further improved.

The control unit may perform a first drive operation in which first drive power is supplied to the discharge lamp and a second drive operation in which second drive power lower than the first drive power is supplied to the discharge lamp and, in the second drive operation, change the length of the modulation drive period in accordance with the detected inter-electrode voltage.

According to the configuration described above, the above-mentioned effect resulting from a change in thermal load according to the degradation of the discharge lamp can be enhanced.

The control unit may repeat the modulation drive period with a predetermined gap between the repeated modulation drive periods.

According to the configuration described above, the modulation drive periods can be readily provided in a preferable manner, and the life of the discharge lamp can be further improved.

The control unit may increase length of the predetermined gap in accordance with decrease of drive power supplied to the discharge lamp.

According to the configuration described above, since the frequency at which the modulation drive periods are provided can be appropriately set in accordance with the drive power, whereby the life of the discharge lamp can be further improved.

The control unit may increase a width of a change between a maximum and a minimum of the length of the first DC period and a width of a change between a maximum and a minimum of the length of the second DC period in accordance with decrease of drive power supplied to the discharge lamp.

According to the configuration described above, when the drive power is relatively high, the width of the change in or the width between the maximum and the minimum of the magnitude of the thermal load in each of the DC periods can be reduced, whereby a situation in which the protrusions excessively melt can be avoided. When the drive power is relatively low, the width of the change in or the width between the maximum and the minimum of the magnitude of the thermal load in each of the DC periods can be increased, whereby the stimulus resulting from the change in the thermal load applied to the first electrode can be increased. As a result, even when the drive power is relatively low, the protrusions are allowed to melt in a preferable manner in the modulation drive period. The life of the discharge lamp can therefore be further improved.

The control unit may control the discharge lamp driving unit in such a way that the second period is replaced with a third period in a case where length of the second period is greater than a predetermined value, and the third period may alternately contain a first polarity period in which DC current is supplied to the discharge lamp and a second polarity period in which DC current having a polarity opposite a polarity of the DC current supplied to the discharge lamp in the first polarity period is supplied to the discharge lamp. Length of the first polarity period may be greater than length of the second polarity period, and the length of the second polarity period may be smaller than 0.5 ms.

According to the configuration described above, the electrode heated in the third period can be sufficiently heated, and a situation in which the temperature of the other electrode excessively lowers can be avoided.

A light source apparatus according to another aspect of the invention includes a discharge lamp configured to emit light and the discharge lamp driver described above.

Since the light source apparatus according to the aspect of the invention includes the discharge lamp driver described above, the life of the discharge lamp can be improved.

A projector according to another aspect of the invention includes the light source apparatus described above, a light modulator configured to modulate the light outputted from the light source apparatus in accordance with an image signal, and a projection system configured to project the light modulated by the light modulator.

Since the projector according to the aspect of the invention includes the light source apparatus described above, the life of the discharge lamp can be improved.

A discharge lamp driving method according to another aspect of the invention is a discharge lamp driving method for supplying drive current to a discharge lamp and driving the discharge lamp including a first electrode and a second electrode, the method including supplying the discharge lamp with the drive current having a modulation drive period in which a first period and a second period are alternately repeated, the first period in which AC current having a frequency higher than 1 kHz is supplied to the discharge lamp, the second period in which DC current is supplied to the discharge lamp, inverting a polarity of the DC current supplied to the discharge lamp in the second period whenever the second period is provided, periodically changing, in the modulation drive period, length of a first DC period and length of a second DC period, the first DC period included in a plurality of the second periods and in which DC current of a first polarity is supplied to the discharge lamp, the second DC period included in the plurality of the second periods and in which DC current of a second polarity is supplied to the discharge lamp, and increasing, in the modulation drive period, one of the length of the first DC period and the length of the second DC period while decreasing another one of the length of the first DC period and the length of the second DC period.

The discharge lamp driving method according to another aspect of the invention can improve the life of the discharge lamp, as in the cases described above.

BRIEF DESCRIPTION OF THE DRAWINGS

The invention will be described with reference to the accompanying drawings, wherein like numbers reference like elements.

FIG. 7 is a diagrammatic view showing the change in the period for which drive current is supplied to the discharge lamp in the first embodiment.

DESCRIPTION OF EXEMPLARY EMBODIMENTS

A projector according to each embodiment of the invention will be described below with reference to the drawings.

The scope of the invention is not limited to the following embodiments and can be arbitrarily changed within the scope of the technical idea of the invention. In the following drawings, for clarity of each configuration, the scale, the number, and other factors of the structure of the configuration differ from those of an actual structure in some cases.

First Embodiment

Figure 1:
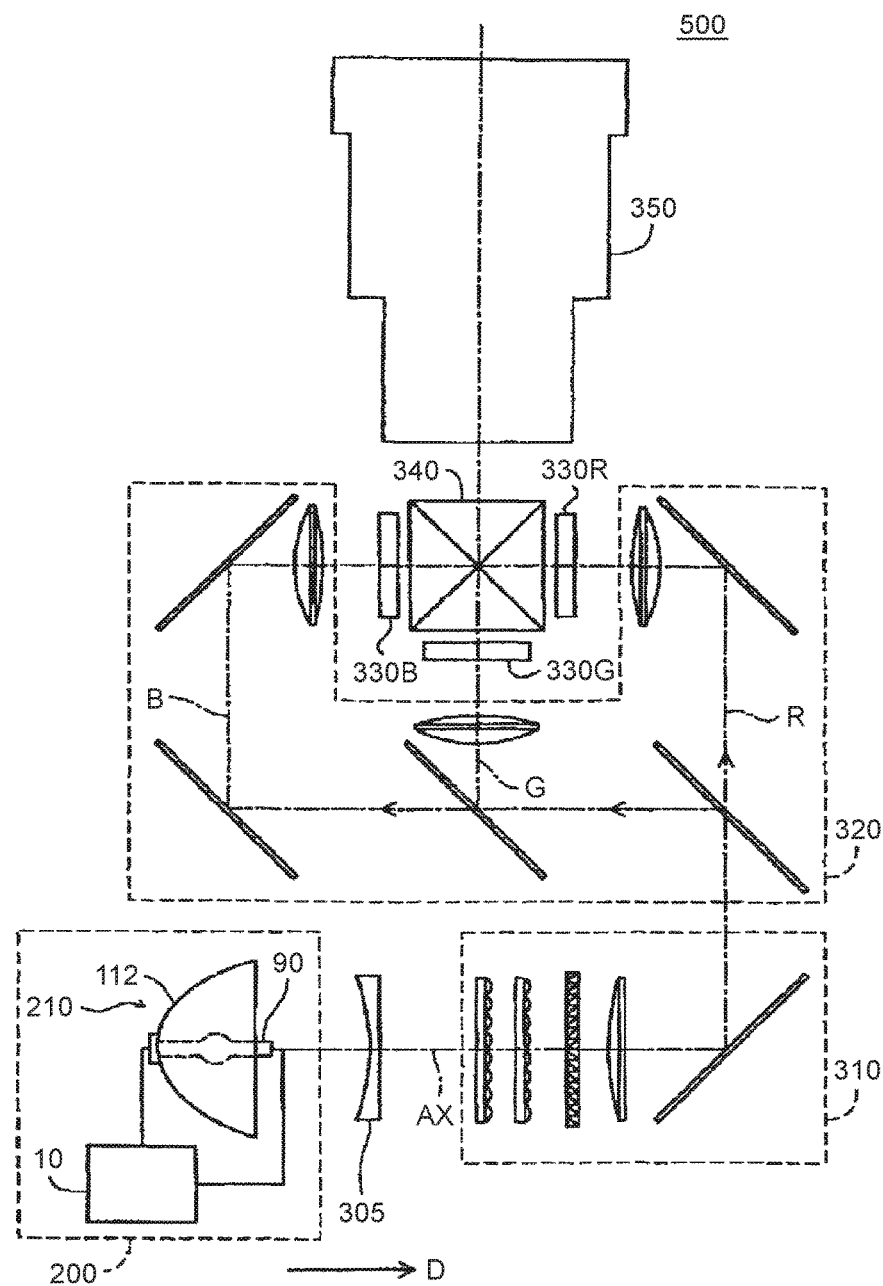
FIG. 1 is a schematic configuration diagram of a projector according to a first embodiment.

A projector 500 according to the present embodiment includes a light source apparatus 200, a parallelizing lens 305, an illumination system 310, a color separation system 320, three liquid crystal light valves (light modulators) 330R, 330G, and 330B, a cross dichroic prism 340, and a projection system 350, as shown in FIG. 1.

Light outputted from the light source apparatus 200 passes through the parallelizing lens 305 and enters the illumination system 310. The parallelizing lens 305 parallelizes the light from the light source apparatus 200.

The illumination system 310 adjusts the illuminance of the light outputted from the light source apparatus 200 in such a way that the illuminance are homogenized over each of the liquid crystal light valves 330R, 330G, and 330B. The illumination system 310 further aligns the polarization directions of the light outputted from the light source apparatus 200 with one another to form light having a single polarization direction in order to allow the liquid crystal light valves 330R, 330G, and 330B to effectively use the light outputted from the light source apparatus 200.

The light adjusted in terms of the illumination distribution and the polarization direction enters the color separation system 320. The color separation system 320 separates the light incident thereon into three color light fluxes, red light (R), green light (G), and blue light (B). The three color light fluxes are modulated by the liquid crystal light valves 330R, 330G, and 330B, which are related to the respective color light fluxes, in accordance with video signals. The liquid crystal light valves 330R, 330G, and 330B include liquid crystal panels 560R, 560G, and 560B, which will be described later, and polarizers (not shown). The polarizers are disposed on the light incident side and the light exiting side of the liquid crystal panels 560R, 560G, and 560B.

The three modulated color light fluxes are combined with one another by the cross dichroic prism 340. The combined light enters the projection system 350. The projection system 350 projects the light incident thereon onto a screen 700 (see FIG. 3). Video images are thus displayed on the screen 700. The configuration of each of the parallelizing lens 305, the illumination system 310, the color separation system 320, the cross dichroic prism 340, and the projection system 350 can be a known configuration.

Figure 2:
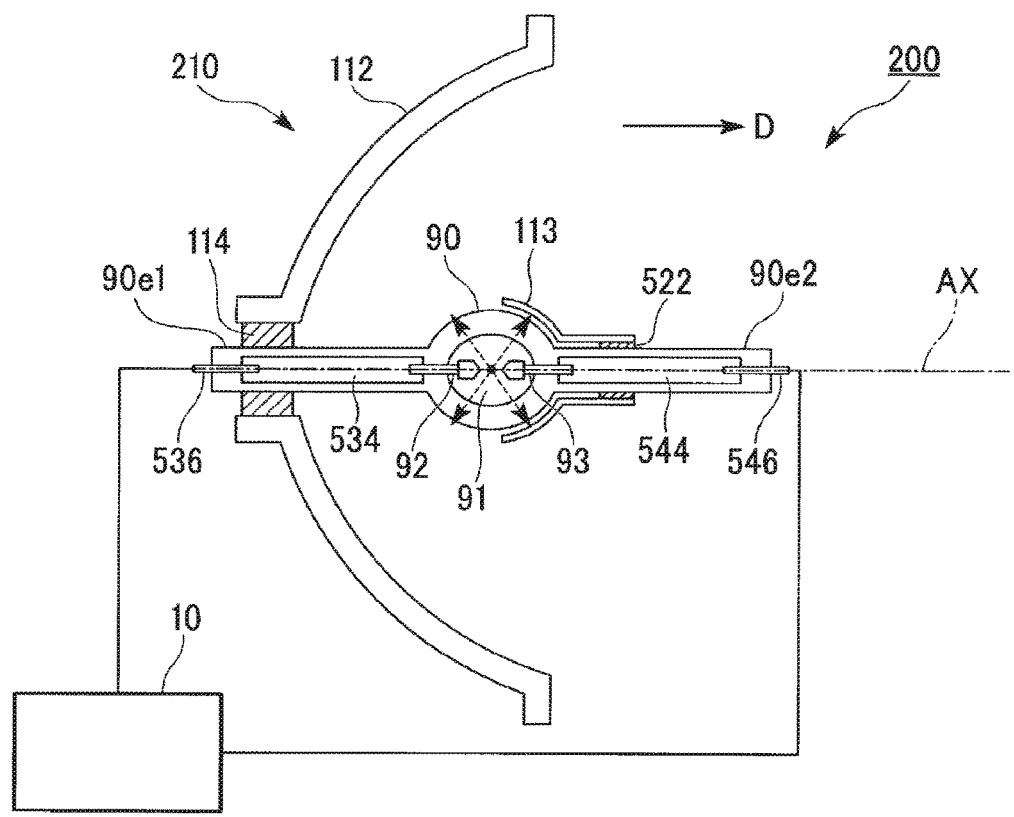
FIG. 2 shows a discharge lamp in the first embodiment.

FIG. 2 is a cross-sectional view showing the configuration of the light source apparatus 200. The light source apparatus 200 includes a light source unit 210 and a discharge lamp starter (discharge lamp driver) 10. FIG. 2 shows a cross unit of the light source unit 210. The light source unit 210 includes a primary reflection mirror 112, a discharge lamp 90, and a secondary reflection mirror 113.

The discharge lamp starter 10 supplies the discharge lamp 90 with drive current I to turn on the discharge lamp 90. The primary reflection mirror 112 reflects light radiated from the discharge lamp 90 to cause the light to travel in an irradiation direction D. The irradiation direction D is parallel to the optical axis AX of the discharge lamp 90.

The discharge lamp 90 has a rod-like shape extending along the irradiation direction 33. An end portion of the discharge lamp 90 on one side is called a first end portion 90e1, and another end portion of the discharge lamp 90 on the other side is called a second end portion 90e2. The discharge lamp 90 is made, for example, of quartz glass or any other light transmissive material. The discharge lamp 90 has a spherically convex central portion, and a discharge space 91 is formed in the central portion. The discharge space 91 encapsulates a gas that serves as a discharge medium containing a rare gas, a metal halogen compound, and other substances.

Front ends of a first electrode 92 and a second electrode 93 protrude into the discharge space 91. The first electrode 92 is disposed in the discharge space 91 and on the side facing the first end portion 90e1. The second electrode 93 is disposed in the discharge space 91 and on the side facing the second end portion 90e2. The first electrode 92 and the second electrode 93 each have a rod-like shape extending along the optical axis AX. In the discharge space 91, electrode front end portions of the first electrode 92 and the second electrode 93 are so disposed as to face each other with a predetermined distance therebetween. The first electrode 92 and the second electrode 93 are made, for example, of tungsten or any other metal.

The first end portion 90e1 of the discharge lamp 90 is provided with a first terminal 536. The first terminal 536 is electrically connected to the first electrode 92 via an electrically conductive member 534, which passes through the interior of the discharge lamp 90. Similarly, the second end portion 90e2 of the discharge lamp 90 is provided with a second terminal 546. The second terminal 546 is electrically connected to the second electrode 93 via an electrically conductive member 544, which passes through the interior of the discharge lamp 90. The first terminal 536 and the second terminal 546 are made, for example, of tungsten or any other metal. The electrically conductive members 534 and 544 are each formed, for example, of a molybdenum foil.

The first terminal 536 and the second terminal 546 are connected to the discharge lamp starter 10. The discharge lamp starter 10 supplies the first terminal 536 and the second terminal 546 with the drive current I for driving the discharge lamp 90. As a result, arc discharge occurs in the space between the first electrode 92 and the second electrode 93. Light produced by the arc discharge (discharge light) is omnidirectionally radiated from the discharge position, as indicated by the broken-line arrows.

The primary reflection mirror 112 is fixed to the first end portion 90e1 of the discharge lamp 90 via a fixing member 114. The primary reflection mirror 112 reflects light that is part of the discharge light and travels in the direction opposite the irradiation direction D and causes the light to travel in the irradiation direction D. The reflection surface of the primary reflection mirror 112 (surface facing discharge lamp 90) does not necessarily have a specific shape as long as the reflection surface can reflect the discharge light in the irradiation direction D and may, for example, have a spheroidal shape or a paraboloidal shape. For example, when the reflection surface of the primary reflection mirror 112 has a paraboloidal shape, the primary reflection mirror 112 can convert the discharge light into light roughly parallel to the optical axis AX, in this case, the parallelizing lens 305 can be omitted.

The secondary reflection mirror 113 is fixed to the second end Portion 90e2 of the discharge lamp 90 via a fixing member 522. The reflection surface of the secondary reflection mirror 113 (surface facing discharge lamp 90) has a spherical shape that surrounds a portion of the discharge space 91, the portion facing the second end portion 90e2. The secondary reflection mirror 113 reflects light that is part of the discharge light and travels toward the side opposite the side where the primary reflection mirror 112 is disposed and causes the light to travel toward the primary reflection mirror 112. The light radiated from the discharge space 91 can thus be used at increased efficiency.

The material of the fixing members 114 and 522 is not limited to a specific material as long as they are made of a heat-resistant material that can withstand heat generated by the discharge lamp 90 and is, for example, an inorganic adhesive. A method for securely arranging the primary reflection mirror 112, the secondary reflection mirror 113, and the discharge lamp 90 is not limited to the method for fixing the primary reflection mirror 112 and the secondary reflection mirror 113 to the discharge lamp 90 but can be any other arbitrary method. For example, the discharge lamp 90 and the primary reflection mirror 112 may independently be fixed to an enclosure (not shown) of the projector 500. The same holds true for the secondary reflection mirror 113.

The circuit configuration of the projector 500 will be described below.

Figure 3:
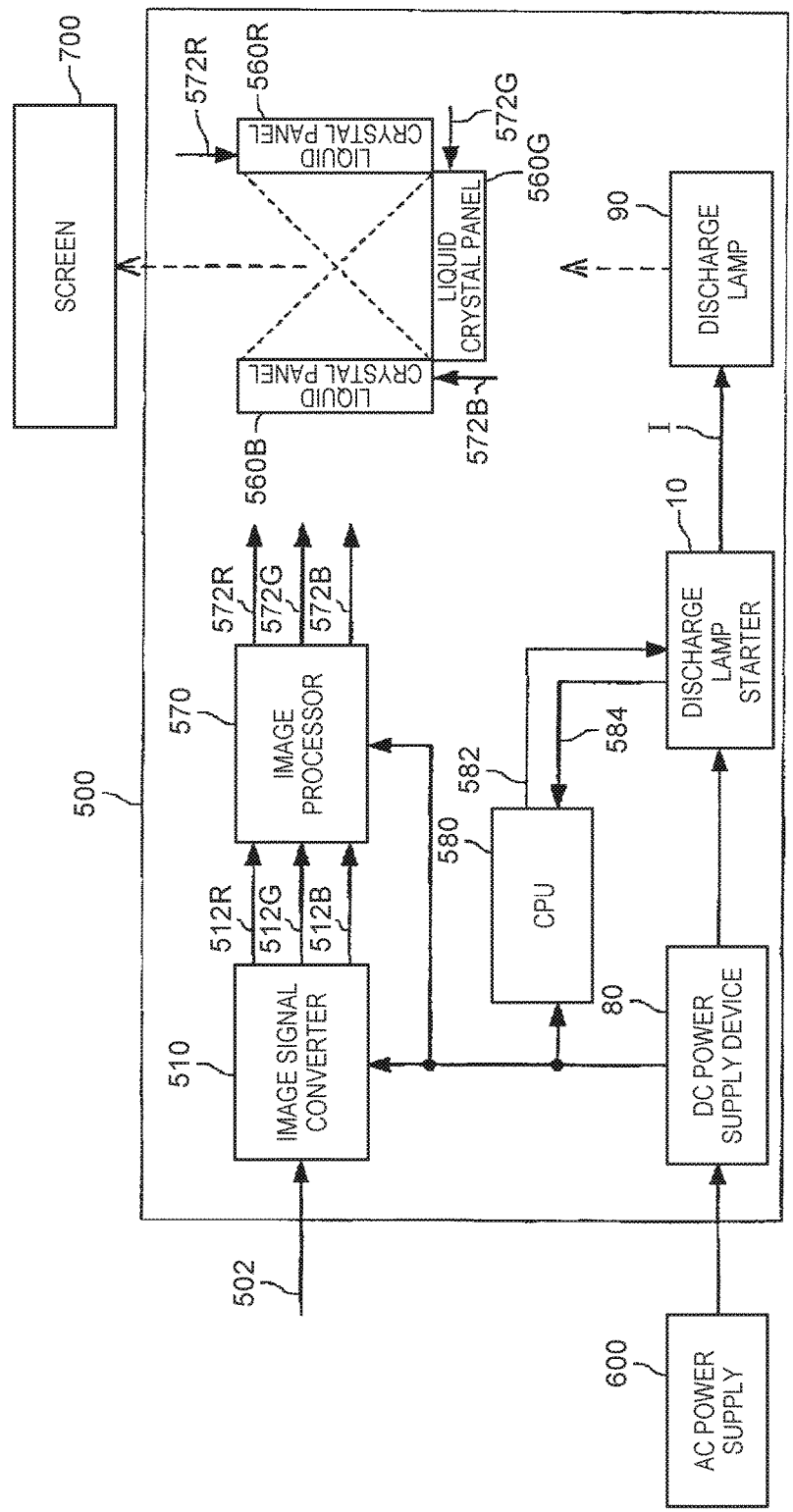
FIG. 3 is a block diagram showing a variety of components of the projector according to the first embodiment.

FIG. 3 shows an example of the circuit configuration of the projector 500 according to the present embodiment. The projector 500 includes an image signal converter 510, a DC power supply device 80, the liquid crystal panels 560R, 560G, and 560B, an image processor 570, and a CPU (central processing unit) 580 as well as the optical system shown in FIG. 1.

The image signal converter 510 converts an externally inputted image signal 502 (such as luminance-color difference signal and analog RGB signal) into a digital RGB signal having a predetermined word length to produce image signals 512R, 512G, and 512B and supplies the image processor 570 with the produced image signals.

The image processor 570 performs image processing on the three image signals 512R, 512G, and 512B. The image processor 570 supplies the liquid crystal panels 560R, 560G, and 560B with drive signals 572R, 572G, and 572B for driving the liquid crystal panels 560R, 560G, and 560B, respectively.

The DC power supply device 80 converts AC voltage supplied from an external AC power supply 600 into constant DC voltage. The DC power supply device 80 supplies the DC voltage to the image signal converter 510 and the image processor 570, which are located on the secondary side of a transformer (not shown but accommodated in DC power supply device 80), and the discharge lamp starter 10, which is located on the primary side of the transformer.

The discharge lamp starter 10 produces high voltage in the space between the electrodes of the discharge lamp 90 when the projector 500 is activated to cause dielectric breakdown in the space for formation of a discharge path. Thereafter, the discharge lamp starter 10 supplies the drive current I for allowing the discharge lamp 90 to maintain the discharge.

The liquid crystal panels 560R, 560G, and 560B are provided in the liquid crystal light valves 330R, 330G, and 330B described above, respectively. The liquid crystal panels 560B, 560G, and 560B modulate transmittance (luminance) of the color light fluxes incident via the optical system described above on the liquid crystal panels 560R, 560G, and 560B on the basis of the drive signals 572R, 572G, and 572B.

The CU 580 controls a variety of actions of the projector 500 in the period from the time when the projector 500 is turned on to the time when the projector 500 is turned off. For example, in FIG. 3, the CPU 580 outputs a turn-on command and a turn-off command carried by a communication signal 582 to the discharge lamp starter 10. The CPU 580 receives information representing the turn-on state of the discharge lamp 90 and carried by a communication signal 584, from the discharge lamp starter 10.

The configuration of the discharge lamp starter 10 will be described below.

Figure 4:
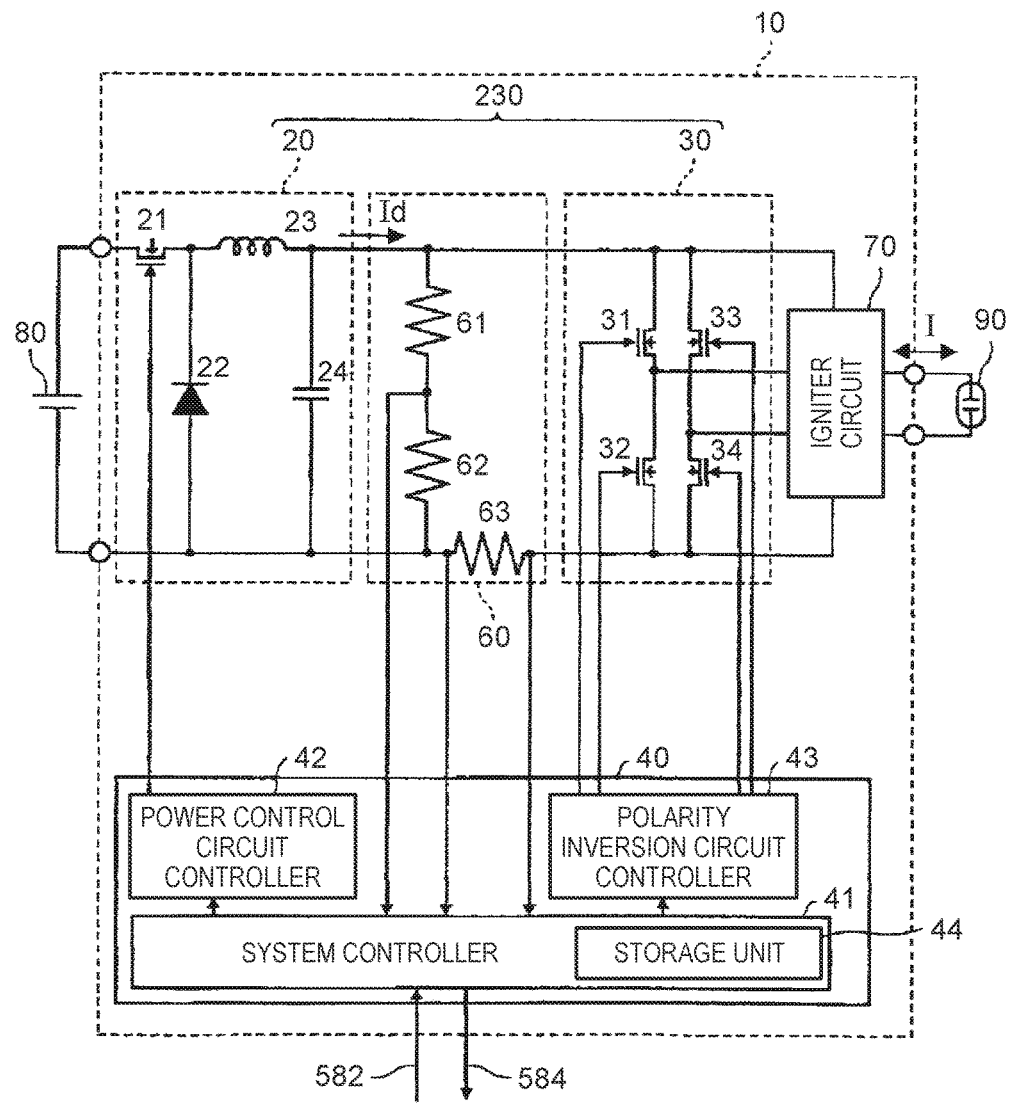
FIG. 4 is a circuit diagram of a discharge lamp starter according to the first embodiment.

FIG. 4 shows an example of the circuit configuration of the discharge lamp starter 10.

The discharge amp starter 10 includes a power control circuit 20, a polarity inversion circuit 30, a control unit 40, an action detector 60, and an igniter circuit 70, as shown in FIG. 4.

The power control circuit 20 produces drive power Wd to be supplied to the discharge lamp 90. In the present embodiment, the power control circuit 20 is formed of a down-chipper circuit that receives, as an input, voltage from the DC power supply device 80, lowers the input voltage, and outputs DC current Id.

The power control circuit 20 includes a switch element 21, a diode 22, a coil 23, and capacitor 24. The switch element 21 is formed, for example, of a transistor. In the present embodiment, one end of the switch element 21 is connected to the positive voltage side of the DC power supply device 80, and the other end of the switch element 21 is connected to the cathode terminal of the diode 22 and one end of the coil 23.

One end of the capacitor 24 is connected to the other end of the coil 23, and the other end of the capacitor 24 is connected to the anode terminal of the diode 22 and the negative voltage side of the DC power supply device 80. A current control signal is inputted from the control unit 40, which will be described later, to the control terminal of the switch element 21 to control ON/OFF of the switch element 21. The current control signal may, for example, be a PWM (pulse width modulation) control signal.

When the switch element 21 is turned on, current flows through the coil 23, and energy is stored in the coil 23. Thereafter, when the switch element 21 is turned off, the energy stored in the coil 23 is released along the paths passing through the capacitor 24 and the diode 22. As a result, the DC current Id according to the proportion of the period for which the switch element 21 is ON is produced.

The polarity inversion circuit 30 inverts, at a predetermined timing, the polarity of the DC current Id inputted from the power control circuit 20. The polarity inversion circuit 30 thus produces drive current I that is DC current that lasts only for a controlled period or drive current I that is AC current having an arbitrary frequency and outputs the produced drive current I. In the present embodiment, the polarity inversion circuit 30 is formed of an inverter bridge circuit (full-bridge circuit).

The polarity inversion circuit 30 includes, for example, a first switch element 31, a second switch element 32, a third switch element 33, and a fourth switch element 34, each of which is formed, for example, of a transistor. The polarity inversion circuit 30 has a configuration in which the first switch element 31 and the second switch element 32, which are connected in series to each other, are connected in parallel to the third switch element 33 and the fourth switch element 34, which are connected in series to each other. Polarity inversion control signals are inputted from the control unit 40 to the control terminals of the first switch element 31, the second switch element 32, the third switch element 33, and the fourth switch element 34. The ON/OFF actions of the first switch element 31, the second switch element 32, the third switch element 33, and the fourth switch element 34 are controlled on the basis of the polarity inversion control signals.

The polarity inversion circuit 30 alternately repeats an action of turning on and off the first switch element 31 and the fourth switch element 34 and an action of turning on and off the second switch element 32 and the third switch element 33. The polarity of the DC current Id outputted from the power control circuit 20 is thus alternately inverted. The polarity inversion circuit 30 produces drive current I that is DC current that keeps the same polarity state for a controlled period or drive current I that is AC current having a controlled frequency and outputs the produced drive current I via a node common to the first switch element 31 and the second switch element 32 and a node common to the third switch element 33 and the fourth switch element 34.

That is, the polarity inversion circuit 30 is so controlled that the second switch element 32 and the third switch element 33 are OFF the first switch element 31 and the fourth switch element 34 are ON and the second switch element 32 and the third switch element 33 are ON when the first switch element 31 and the fourth switch element 34 are OFF. Therefore, when the first switch element 31 and the fourth switch element 34 are ON, drive current I sequentially flowing from the one end of the capacitor 24 through the first switch element 31, the discharge lamp 90, and the fourth switch element 34 is produced. When the second switch element 32 and the third switch element 33 are ON, drive current I sequentially flowing from the one end of the capacitor 24 through the third switch element 33, the discharge lamp 90, and the second switch element 32 is produced.

In the present embodiment, the combination of the power control circuit 20 and the polarity inversion circuit 30 corresponds to a discharge lamp driver 230. That is, the discharge lamp driver 230 supplies the discharge lamp 90 with the drive current I, which drives the discharge lamp 90.

The control unit 40 controls the discharge lamp driver 230. In the example shown in FIG. 4, the control unit 40 controls the power control circuit 20 and the polarity inversion circuit 30 to control the retention period for which the drive current I keeps the same polarity, the current value of the drive current I, the power value of the drive power Wd, the frequency of the drive current I, and other parameters. The control unit 40 performs polarity inversion control. In which the retention period for which the drive current I keeps the same polarity, the frequency of the drive current I, and other parameters are controlled, on the polarity inversion circuit 30 at the timing when the polarity of the drive current I is inverted. The control unit 40 performs current control, in which the current value of the DC current Id to be outputted is controlled, on the power control circuit 20.

The control unit 40 does not necessarily have a specific configuration. In the present embodiment, the control unit 40 includes a system controller 41, a power control circuit controller 42, and a polarity inversion circuit controller 43. The control unit 40 may be so configured that part or entirety thereof is formed of a semiconductor integrated circuit.

The system controller 41 controls the power control circuit controller 42 and the polarity inversion circuit controller 43 to control the power control circuit 20 and the polarity inversion circuit 30. The system controller 41 may control the power control circuit controller 42 and the polarity inversion circuit controller 43 on the basis of lamp voltage (inter-electrode voltage) V1a, which is detected by the action detector 60, and the drive current I.

In the present embodiment, a storage unit 44 is connected to the system controller 41.

The system controller 41 may control the power control circuit 20 and the polarity inversion circuit 30 on the basis of information stored in the storage unit 44. The storage unit 44 may store, for example, information on the retention period for which the drive current I keeps the same polarity, the current value, the frequency, the waveform, and the modulation pattern of the drive current I, and other drive parameters.

The power control circuit controller 42 controls the power control circuit 20 by outputting a current control signal to the power control circuit 20 on the basis of a control signal from the system controller 41.

The polarity inversion circuit controller 43 controls the polarity inversion circuit 30 by outputting a polarity inversion control signal to the polarity inversion circuit 30 on the basis of a control signal from the system controller 41.

The control unit 40 can be achieved by using a dedicated circuit and configured to perform the control described above and a variety of types of control of processes described below. Instead, the control unit 40 may, for example, be configured to function as a computer and perform a variety of types of control on the processes by causing a CPU to execute a control program stored in the storage unit 44.

Figure 5:
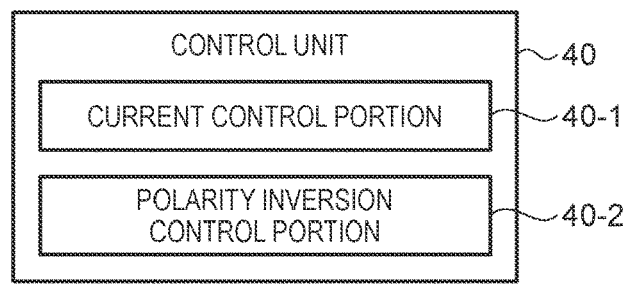
FIG. 5 is a block diagram showing an example of the configuration of a control unit in the first embodiment.

FIG. 5 describes another example of the configuration of the control unit 40. The control unit 40 may be configured to function as a current control portion 40-1, which controls the power control circuit 20, and a polarity inversion control portion 40-2, which controls the polarity inversion circuit 30, by using a control program, as shown in FIG. 5.

In the example shown in FIG. 4, the control unit 40 is configured as part of the discharge lamp starter 10. Instead, the CPU 580 may assume a part of the function of the control unit 40.

In the present embodiment, the action detector 60 includes a voltage detector that detects the lamp voltage Via across the discharge lamp 90 and outputs lamp voltage information to the control unit 40. The action detector 60 may further include, for example, a current detector that detects the drive current I and outputs drive current information to the control unit 40. In the present embodiment, the action detector 60 includes a first resistor 61, a second resistor 62, and a third resistor 63.

In the present embodiment, the voltage detector of the action detector 60 detects the lamp voltage V1a on the basis of divided voltages across the first resistor 61 and the second resistor 62, which are connected in parallel to the discharge lamp 90 and connected in series to each other. Further, in the present embodiment, the current detector detects the drive current I on the basis f the voltage across the third resistor 63, which is connected in series to discharge lamp 90.

The igniter circuit 70 operates only when the discharge lamp 90 is turned on. The igniter circuit 70 supplies the space between the electrodes (between first electrode 92 and second electrode 93) of the discharge lamp 90 with high voltage (voltage higher than voltage used when discharge lamp 90 is normally turned on) necessary for dielectric breakdown in the space between the electrodes (between first electrode 92 and second electrode 93) of the discharge lamp 90 to form the discharge path when the discharge lamp 90 is turned on. In the present embodiment, the igniter circuit 70 is connected in parallel to the discharge lamp 90.

Figure 6A:
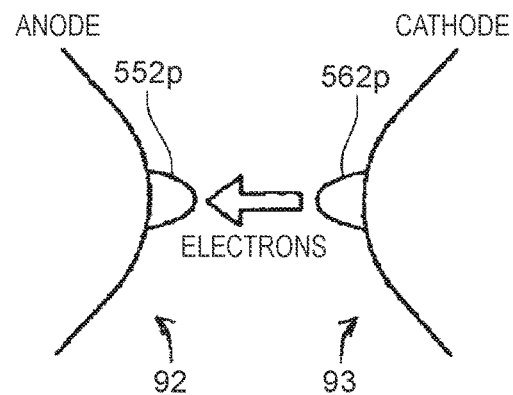
FIG. 6A shows the state of protrusions at the front ends of electrodes of the discharge lamp.
Figure 6B:
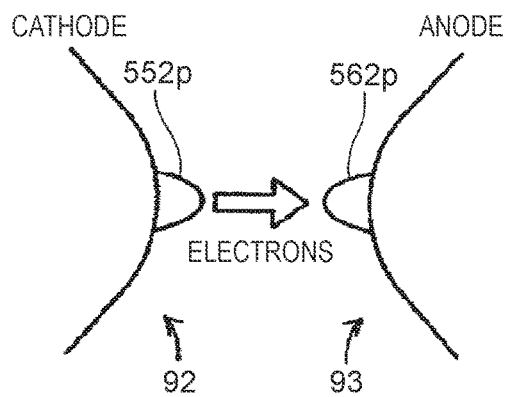
FIG. 6B shows the state of the protrusions at the front ends of the electrodes of the discharge lamp.

FIGS. 6A and 6B show front end portions of the first electrode 92 and the second electrode 93. Protrusions 552p and 562p are formed at the front ends of the first electrode 92 and the second electrode 93, respectively.

The discharge that occurs in the space between the first electrode 92 and the second electrode 93 primarily occurs in the space between the protrusions 552p and 562p. The protrusions 552p and 562p in the present embodiment can suppress movement of the discharge position (arc position) between the first electrode 92 and the second electrode 93, as compared with a case where no protrusion is present.

FIG. 6A shows a first polarity state in which the first electrode 92 operates as the anode and the second electrode 93 operates as the cathode. In the first polarity state, when the discharge occurs, electrons move from the second electrode 93 (cathode) to the first electrode 92 (anode). The cathode (second electrode 93) emits the electrons. The electrons emitted from the cathode (second electrode 93) collide with the front end of the anode (first electrode 92). The collision generates heat, which increases the temperature of the front end (protrusion 552p) of the anode (first electrode 92).

FIG. 6B shows a second polarity state in which the first electrode 92 operates as the cathode and the second electrode 93 operates as the anode. In the second polarity state, the electrons move from the first electrode 92 to the second electrode 93, that is, the second polarity state is the reverse of the first polarity state. As a result, the temperature of the front end (protrusion 562p) of the second electrode 93 increases.

As described above, when the drive current I is supplied to the discharge lamp 90, the temperature of the anode with which the electrons collide increases. On the other hand, the temperature of the cathode that emits the electrons decreases during the period for which the cathode emits the electrons toward the anode.

The inter-electrode distance between the first electrode 92 and the second electrode 93 increases as the protrusions 552p and 562p are degraded. The reason for this is that the protrusions 552p and 562p waste. When the inter-electrode distance increases, the resistance of the space between the first electrode 92 and the second electrode 93 increases, and the lamp voltage V1a therefore increases. Referring to the lamp voltage V1a therefore allows detection of a change in the inter-electrode distance, that is, the degree of degradation of the discharge lamp 90.

Since the first electrode 92 and the second electrode 93 have the same configuration, the following description will be made only of the first electrode 92 as a representative electrode in some cases. Further, since the protrusion 552p at the front end of the first electrode 92 and the protrusion 562p at the front end of the second electrode 93 have the same configuration, the following description will be made only of the protrusion 552p as a representative protrusion in some cases.

How the discharge lamp driver 230 is controlled by the control unit 40 will next be described.

Figure 8:
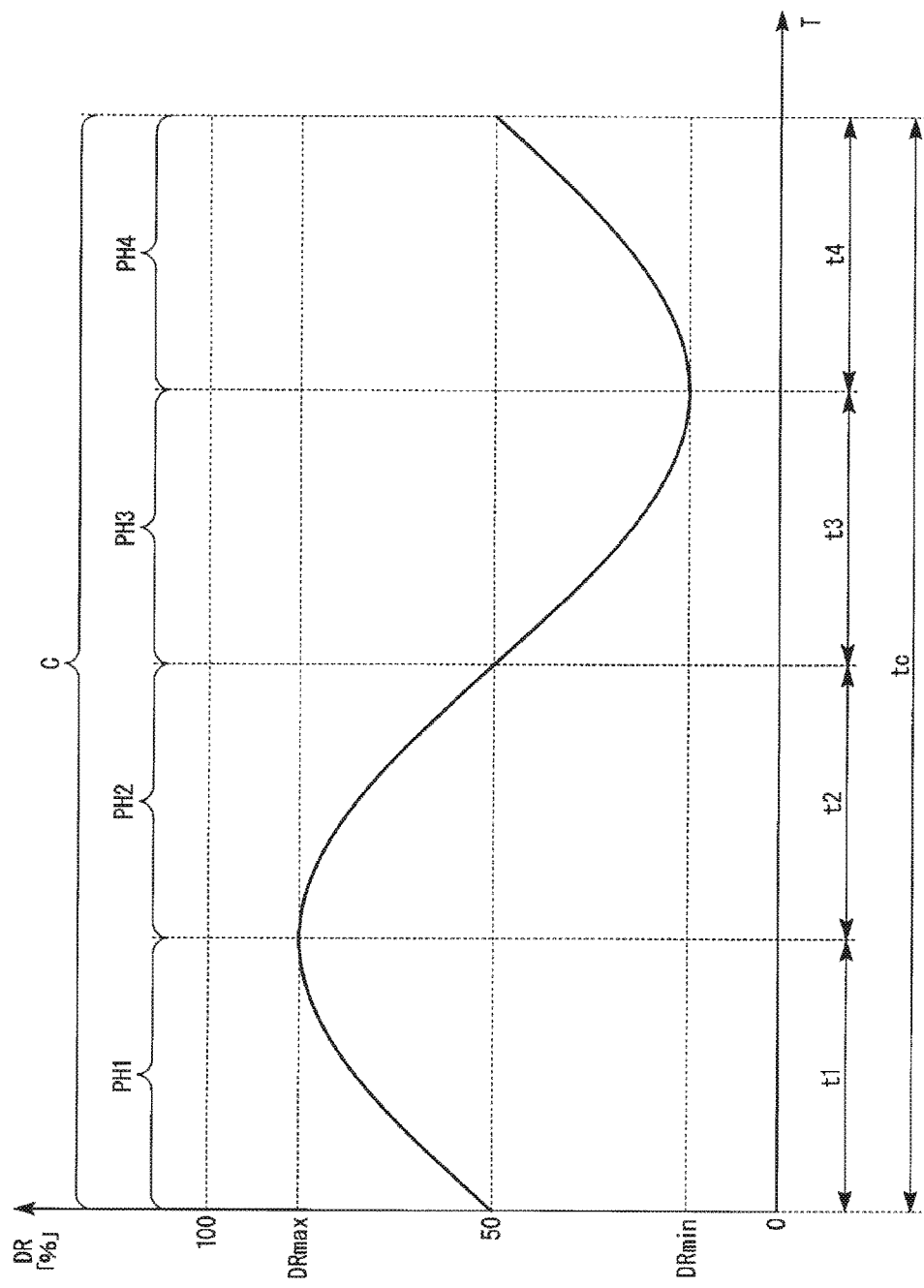
FIG. 8 is a graph showing the change in a duration ratio in a drive cycle in a modulation drive period in the first embodiment.
Figure 9:
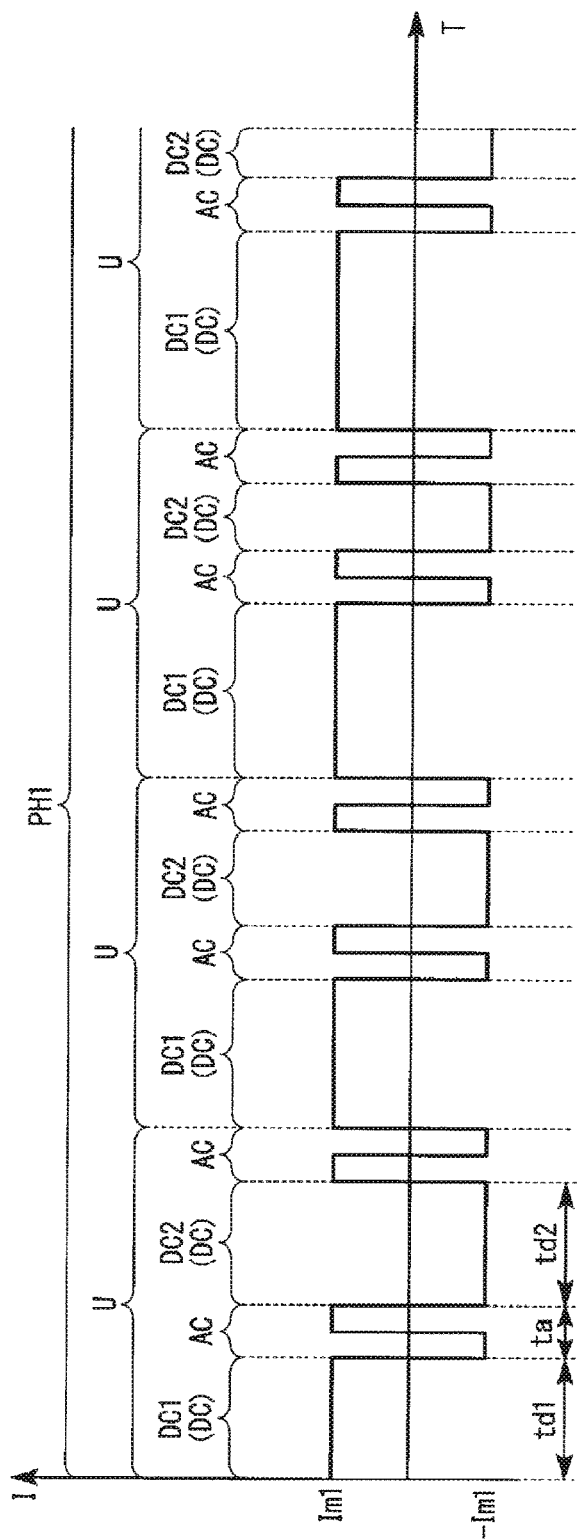
FIG. 9 shows an example of the drive current supplied to the discharge lamp in the modulation drive period in the first embodiment.
Figure 10:
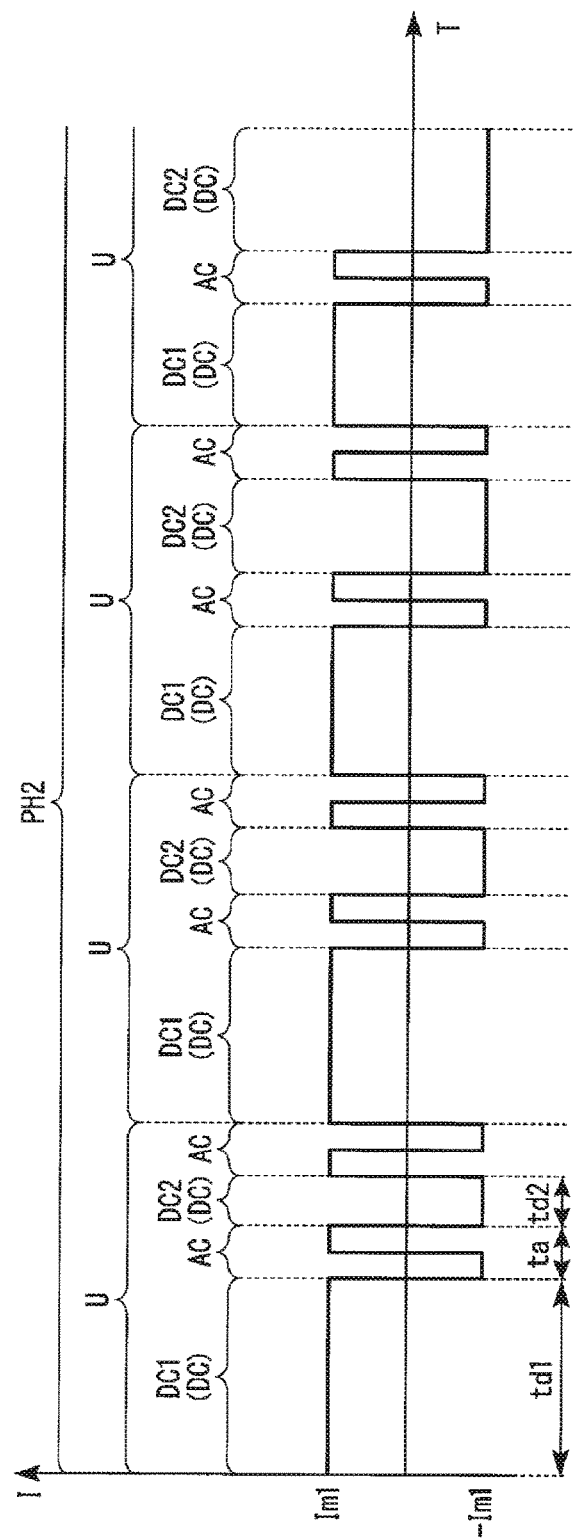
FIG. 10 shows an example of the drive current supplied to the discharge lamp in the modulation drive period in the first embodiment.

FIG. 7 is a diagrammatic view showing the change in the period for which the drive current I is supplied to the discharge lamp 90 in the present embodiment. FIG. 8 is a graph showing a change in a duration ratio DR in a drive cycle C in a modulation drive period VD. The duration ratio DR will be described later in detail. In FIG. 8, the vertical axis represents the duration ratio DR [%], and the horizontal axis represents time T. FIG. 9 shows an example of the drive current I supplied to the discharge lamp 90 in a first modulation period PH1 in the drive cycle C in the modulation drive period VD. FIG. 10 shows an example of the drive current I supplied to the discharge lamp 90 in a second modulation period PH2 in the drive cycle C in the modulation drive period VD. In FIGS. 9 and 10, the vertical axis represents the drive current I, and the horizontal axis represents the time T. In FIGS. 9 and 10, the drive current I is so shown as to be positive in the first polarity state and negative in the second polarity state.

The drive current I supplied to the discharge lamp 90 in the present embodiment alternately has a steady drive period SD and the modulation drive period VD, as shown in FIG. 7. That is, the control unit 40 repeats the modulation drive period VD with a predetermined gap between the repeated modulation drive periods D. In the present embodiment, the predetermined gap corresponds to the length is of the steady drive periods SD.

Each of the steady drive periods SD is a period for which the drive current I for steadily causing the discharge lamp 90 to illuminate is supplied to the discharge lamp 90. The drive current I supplied to the discharge lamp 90 in the steady drive periods SD alternately has, for example, an AC period for which AC current is supplied to the discharge lamp 90 and a DC period for which DC current is supplied to the discharge lamp 90.

In the AC periods in the steady drive periods SD, for example, rectangular-wave AC currents having a plurality of frequencies different from one another are supplied to the discharge lamp 90. The frequencies of the AC currents supplied to the discharge lamp 90 in the AC periods in the steady drive periods SD are, for example, higher than or equal to 150 Hz but lower than or equal to 300 Hz. The length of the AC periods in the steady drive periods SD is, for example, longer than or equal to 10 ms (milliseconds) but shorter than or equal to 10 s (seconds).

In the DC periods in the steady drive periods SD, drive current I having a constant current value is supplied to the discharge lamp 90. For example, in the DC periods in the steady drive periods SD, the polarity may be inverted whenever the DC period is provided, or a predetermine number of DC periods having the same polarity may be provided and repeated. The length of the DC periods in the steady drive periods SD is, for example, longer than or equal to 5 ms (milliseconds) but shorter than or equal to 200 ms (milliseconds).

The drive current I supplied to the discharge lamp 90 it the steady drive periods SD is not limited to the example described above and is not necessarily specific current and may be any drive current I for causing the discharge lamp 90 to steadily illuminate.

Each of the modulation drive periods VD is a period in which a thermal load is applied to the first electrode 92 and the second electrode 93 to melt and shape the protrusions 552p and 562p. In each of the modulation drive periods VD, the drive cycle C shown in FIG. 8 is repeated. The drive cycle C has the first modulation period PH1, the second modulation period PH2, a third modulation period PH3, and a fourth modulation period PH4 in this order.

The drive current I supplied to the discharge lamp 90 in the first modulation period PH1 and the drive current I supplied to the discharge lamp 90 in the second modulation period PH2 alternately has a first period AC and a second period DC, as shown in FIGS. 9 and 10. That is, the drive current I has the modulation drive periods VD, in each of which the first period AC and the second period DC are alternately repeated.

The first period AC is a period in which AC current having a frequency higher than 1 kHz is supplied to the discharge lamp 90. The frequency in the first period AC is, for example, higher than 1 kHz but lower than or equal to 10 GHz. The AC current supplied to the discharge lamp 90 in the first period AC is, for example, rectangular-wave AC current the polarity of which is so inverted that the current value changes from Im1 to −Im1 and vice versa. In the first AC period, the frequency of the AC current supplied to the discharge lamp 90 corresponds, for example, to cycles greater than or equal to one but smaller than or equal to ten. In the examples shown in FIGS. 9 and 10, the frequency of the AC current supplied to the discharge lamp 90 in the first period AC corresponds to one cycle.

The second period DC is a period in which DC current is supplied to the discharge lamp 90. The polarity of the DC current supplied to the discharge lamp 90 in the second period DC is inverted whenever the second period DC is provided. That is, two types of second periods DC are provided: a first DC period DC1, in which DC current having a first polarity is supplied to the discharge lamp 90; and a second DC period DC2, in which DC current having a second polarity is supplied to the discharge lamp 90. In the example shown in FIGS. 9 and 10, in the first DC period DC1, first-polarity drive current I having a constant current value Im is supplied to the discharge lamp 90. In the second DC period DC2, second-polarity drive current I having a constant current value −Im is supplied to the discharge lamp 90.

In the first modulation period PH1 and the second modulation period PH2, a plurality of unit periods U are repeated. The unit periods U each contains one first DC period DC1 and one second DC period DC2. In the example shown in FIGS. 9 and 10, the unit periods U are each formed of a first DC period DC1, a first period AC, a second DC period DC2, and a first period DC contiguously arranged in this order.

Although not shown, the drive current I supplied to the discharge lamp 90 in the third modulation period PH3 and the drive current I supplied to the discharge lamp 90 in the fourth modulation period PH4 each alternately have the first period AC and the second period DC and a plurality of unit periods U are repeated, as in the first modulation period PH1 and the second modulation period PH2. That is, in the drive cycle C formed of the modulation periods described above, a plurality of unit periods U are repeated. The unit period U is therefore repeated in the modulation drive periods VD.

The waveform of the drive current I supplied to the discharge lamp 90 in the third modulation period PH3 is, for example, the waveform of the drive current I supplied to the discharge lamp 90 in the first modulation period PH1 shown in FIG. 9 but inverted in terms of polarity. The waveform of the drive current I supplied to the discharge lamp 90 in the fourth modulation period PH4 is, for example, the waveform of the drive current I supplied to the discharge lamp 90 in the second modulation period PH2 shown in FIG. 10 but inverted in terms of polarity.

In the present embodiment, the length t1 of the first modulation period PH1, the length t2 of the second modulation period PH2, the length t3 of the third modulation period PH3, and the length t4 of the fourth modulation period PH4 are, for example, equal to one another, as shown in FIG. 8.

In the modulation drive periods VD, the control unit 40 periodically changes the length td1 of the first DC period DC1, which is one of the two types of second period DC and in which the first-polarity DC current is supplied to the discharge lamp 90, and the length td2 of the second DC period DC2, which is the other one of the two types of second period DC and in which the second-polarity DC current is supplied to the discharge lamp 90. In the present embodiment, the cycle of the change in the lengths of the DC periods completes whenever the drive cycle C completes. That is, the drive cycle C corresponds to one cycle of the change in the lengths of the DC periods. The cycle of the change in the lengths of the DC periods, that is, the length to of the drive cycle C is, for example, longer than or equal to 1 min (minute) but shorter than or equal to 10 min (minutes). The length tc of the drive cycle C is preferably longer than or equal to 2 min (minutes) but shorter than or equal to 5 min (minutes). The length to of the drive cycle C is more preferably 3 min (minutes). Setting the length tc of the drive cycle C as described above can prevent, the protrusions of the electrodes from being excessively melted, whereby the protrusions can be shaped in a preferable manner.

The change in the length of each of the DC periods varies depending on which modulation period the DC period belongs to.

The length td1 of the first DC period DC1 in the first modulation period PH1 increases whenever the first DC period DC1 is provided, as shown in FIG. 9. The length td2 of the second DC period DC2 in the first modulation period PH1 decreases whenever the second DC period DC2 is provided.

The length td1 of the first DC period DC1 in the second modulation period PH2 decreases whenever the first DC period DC1 is provided, as shown in FIG. 10. The length td2 of the second DC period DC2 in the second modulation period PH2 increases whenever the second DC period DC2 is provided.

Although not shown, the length td1 of the first DC period DC1 in the third modulation period PH3 decreases whenever the first DC period DC1 is provided. The length td2 of the second DC period DC2 in the third modulation period PH3 increases whenever the second DC period DC2 is provided.

Although not shown, the length td1 of the first DC period DC1 in the fourth modulation period PH4 increases whenever the first DC period DC1 is provided. The length td2 of the second DC period DC2 in the fourth modulation period PH4 decreases whenever the second DC period DC2 is provided.

That is, the control unit 40 increases one of the length td1 of the first DC period DC1 and the length td2 of the second DC period DC2 but decreases the other one of the length td1 of the first DC period DC1 and the length td2 of the second DC period DC2 in each of the modulation periods.

In the present embodiment, the lengths of the DC periods change in such a way that the ratio of the length td1 of the first DC period DC1 to the total length td of the length td1 of the first DC period DC1 and the length td2 of the second DC period DC2 in each of the unit periods U periodically changes. In the present specification, the ratio of the length td1 of the first DC period DC1 to the total length td of the length td1 of the first DC period DC1 and the length td2 of the second DC period DC2 in each of the unit periods U is called the duration ratio DR [%].

In the present embodiment, in each of the modulation drive periods VD, the total length td of the length td1 of the first DC period DC1 and the length td2 of the second DC period DC2 in each of the unit periods U is roughly constant. Therefore, in unit periods U adjacent to each other, the amount of change in the length td1 of the first DC period DC1 is roughly equal to the amount of change in the length td2 of the second DC period DC2. That is, in unit periods U adjacent to each other, when the length td1 of the first DC period DC1 increases, the amount of increase in the length td1 of the first DC period DC1 is roughly equal to the amount of decrease in the length td2 of the second DC period DC2.

In the following description, the total length td of the length td1 of the first DC period DC1 and the length td2 of the second DC period DC2 in each of the unit periods U is simply called the total length td in some cases. In the present specification, the situation in which the total length td is roughly constant includes not only a case where the total length td is exactly constant but a situation in which the total length td varies within a range, for example, from a value greater than or equal to about 0.9 times the average of the total length td to value smaller than or equal to about 1.1 times the average of the total length td.

In one drive cycle C, the duration ratio DR changes, for example, in a sinusoidal manner, as shown in FIG. 8.

In the first modulation period PH1, the duration ratio DR monotonously increases from 50% to DRmax. In the second modulation period PH2, the duration ratio DR monotonously decreases from DRmax to 50%. In the third modulation period PH3, the duration ratio DR monotonously decreases from 50% to DRmin. In the fourth modulation period PH4, the duration ratio DR monotonously increases from DRmin to 50%. DRmax is the maximum of the duration ratio DR in the drive cycle C. DRmin is the minimum of the duration ratio DR in the drive cycle C.

The control unit 40 changes the parameters in the modulation drive periods VD in accordance with the drive power Wd supplied to the discharge lamp 90 in the modulation drive periods VD. In the present embodiment, the control unit 40 can perform rated-power drive (first drive) in which rated power (first drive power) is supplied to the discharge lamp 90 and low-power drive (second drive) in which power lower than the rated power (second drive power) is supplied to the discharge lamp 90.

The control unit 40 increases the width of the change in the length td1 of the first DC period DC1 and the width of the change in the length td2 of the second DC period DC2 by a greater amount when lower drive power Wd is supplied to the discharge lamp 90. That is, the width of the change in the length of each of the DC periods in the modulation drive periods VD in the low-power drive operation is greater than the width of the change in the length of each of the DC periods in the modulation drive periods VD in the rated-power drive operation. In the present embodiment, the control unit 40 increases the width of the change in or the width between the maximum and the minimum of the length td1 of the first DC period DC1 and the width of the change in or the width between the maximum and the minimum of the length td2 of the second DC period DC2, for example, by increasing the width of the change in the duration ratio DR, that is, the width between the maximum DRmax and the minimum DRmin.

The control unit 40 increases the gap provided between the modulation drive periods VD (predetermined gap) by a greater amount when lower drive power Wd is supplied to the discharge lamp 90. That is, the gap provided between the modulation drive periods VD in the low-power drive operation is greater than the gap provided between the modulation drive periods VD in the rated-power power drive operation. In the present embodiment, the control unit 40 increases the gap provided between the modulation drive periods VD by increasing the length is of the steady drive period SD sandwiched between the modulation drive periods VD shown in FIG. 7.

The control unit 40 increases the length tv of the modulation drive periods VD by a greater amount when lower drive power Wd is supplied to the discharge lamp 90. That is, the length tv of the modulation drive periods VD in the low-power drive operation is longer than the length tv of the modulation drive periods VD in the rated-power drive operation.

Table 1 shows an example of the parameters in the modulation drive periods VD in the rated-power drive operation and an example of the parameters in the modulation drive periods VD in the low-power drive operation.

TABLE 1

|  | Gap between modulation drive periods [h] (Length of steady drive period ts) | Total length td [ms] | Width of change in duration ratio DR | Number of cycles | Length of modulation drive period tv [h] |
| --- | --- | --- | --- | --- | --- |
| Rated-power drive | 2 | 5.0 | 33%-67% | 3 | 0.15 |
| Low-power drive | 20 | 2.5 | 20%-80% | 5 | 0.25 |

In Table 1, the width of the change in the duration ratio DR shows the minimum DRmin and the maximum DRmax of the duration ratio DR. In Table 1, in the case where the width of the change in the duration ratio DR ranges from 33% to 67%, the minimum DRmin is 33%, and the maximum DRmax is 67%. Further, the number of cycles represents the number of drive cycles C present in one modulation drive period VD. In Table 1, the length tc of the drive cycle C is the same both in the rated-power drive and the low-power drive. The length tc of the drive cycle C is the length tv of the modulation drive periods VD divided by the number of cycles. In the example shown in Table 1, the length tc of the drive cycle C is 3 min (minutes) both in the rated-power drive and the low-power drive.

In the present embodiment, the control unit 40 does not change the parameters in the modulation drive periods VD irrespective of the lamp voltage V1a, for example, in the rated-power drive. On the other hand, the control unit 40 changes the parameters in the modulation drive periods VD in accordance with the lamp voltage V1a detected by the voltage detector of the action detector 60 in the low-power drive.

The control unit 40 changes the total length td in the modulation drive periods D in accordance with the detected lamp voltage V1a in the low-power drive. Specifically, the control unit 40 increases the total length td in the modulation drive periods VD by a greater amount when higher lamp voltage V1a is detected.

The control unit 40 changes the length tv of the modulation drive periods VD in accordance with the detected lamp voltage V1a in the low-power drive. Specifically, the control unit 40 increases the length tv of the modulation drive periods VD when higher lamp voltage V1a is detected.

Table 2 shows an example of the changes in the parameters in the modulation drive periods VD in accordance with the lamp voltage V1a in the low-power drive operation.

The discharge lamp starter 10 including the control unit 40, which performs the control described above, can be implemented in the form of a discharge lamp driving method. That is, an aspect of the discharge lamp driving method according to the present embodiment is a discharge lamp driving method for driving the discharge lamp 90 by supplying the drive current I to the discharge lamp 90 including the first electrode 92 and the second electrode 93, and the method includes supplying the discharge lamp 90 with the drive current I having the modulation drive periods VD, in each of which the first period AC, in which AC current having a frequency higher than 1 kHz is supplied to the discharge lamp 90, and the second period DC, in which DC current is supplied to the discharge lamp 90, are alternately repeated, inverting the polarity of the DC current supplied to the discharge lamp 90 in the second period DC whenever the second period DC is provided, periodically changing, in each of the modulation drive periods VD, the length td1 of the first DC period DC1, which forms the second period DC and in which DC current of the first polarity is supplied to the discharge lamp 90, and the length td2 of the second DC period DC2, which forms the second period DC and in which DC current of the second polarity is supplied to the discharge lamp 90, and increasing one of the length td1 of the first DC period DC1 and the length td2 of the second DC period DC2 but decreasing the other one of the length td1 of the first DC period DC1 and the length td2 of the second DC period DC2.

According to the present embodiment, the control unit 40 periodically changes the length td1 of the first DC period DC1 and the length td2 of the second DC period DC2 in each of the modulation drive periods VD. Therefore, in each of the modulation drive periods VD, when the length td1 of the first DC period DC1 is increased, for example, thermal load applied to the first electrode 92 can be increased to melt the protrusion 552p of the first electrode 92. On the other hand, when the length td1 of the first DC period DC1 is decreased,

TABLE 2

| Lamp voltage V1a | Gap between modulation drive periods [h] (Length of steady drive period ts) | Total length td [ms] | Width of change in duration ratio DR | Number of cycles | Length of modulation drive period tv [h] |
| --- | --- | --- | --- | --- | --- |
| Lower than 80 V | 20 | 2.5 | 20%-80% | 5 | 0.25 |
| Higher than or equal to 80 V but lower than 90 V | 20 | 2.5 | 20%-80% | 10 | 0.5 |
| Higher than or equal to 90 V but lower than 100 V | 20 | 2.5 | 20%-80% | 20 | 1 |
| Higher than or equal to 100 V but lower than 110 V | 20 | 7.5 | 20%-80% | 20 | 1 |
| Higher than or equal to 110 V | 20 | 7.5 | 20%-80% | 40 | 2 |

The meanings of the parameters in Table 2 are the same as those of the parameters in Table 1. In Table 2, the length tc of the drive cycle C is unchanged irrespective of the lamp voltage V1a. In the example shown in Table 2, the length tc of the drive cycle C is always 3 min (minutes).

thermal load applied to the first electrode 92 can be lowered to allow the melted protrusion 552p to solidify and allow the protrusion 552p to grow. It is noted that the higher the thermal load applied to the first electrode 92, the wider the range over which the protrusion 552p is melted, whereas the lower the thermal load applied to the first electrode 92, the narrower the range over which the protrusion 552p is melted. Decreasing the length td1 of the first DC period DC1 therefore allows a decrease in the thermal load applied to the first electrode 92, whereby the range over which the protrusion 552p is melted can be gradually narrowed. As a result, the protrusion 552p having successively melted from the base thereof solidifies, and the range over which the protrusion 552p solidifies gradually narrows. Therefore, the protrusion 552p is allowed to grow in such a way that it successively piles up from the base thereof, and the protrusion 552p is allowed to have a sharply pointing front end.

Consider now, for example, a case where the increase and decrease in the length td1 of the first DC period DC1 and the increase and decrease in the length td2 of the second DC period DC2 are performed at the same timing. In this case, while the length td1 of the first DC period DC1 is increased, the length td2 of the second DC period DC2 is also increased, and while the length td1 of the first DC period DC1 is decreased, the length td2 of the second DC period DC2 is also decreased. While one of the electrodes is so heated as to melt, the temperature of the other electrode decreases. Therefore, for example, when the length td1 of the first DC period DC1 is increased, the thermal load applied to the first electrode 92 in the first DC period DC1 keeps increasing, whereas the amount of decrease in the temperature of the second electrode 93 in the first DC period DC1 therefore increases. In view of the fact described above, when the lengths of the DC periods are both increased, the thermal load applied to the electrode heated in each of the DC periods increases, but the amount of decrease in the temperature of the other electrode in the DC period also increases. As a result, the temperatures of the first electrode 92 and the second electrode 93 are unlikely to sufficiently increase. Therefore, the protrusion 552p of the first electrode 92 and the protrusion 562p of the second electrode 93 are unlikely to be sufficiently melted, so that the protrusion 552p is unlikely to be allowed to sufficiently grow. The life of the discharge lamp 90 cannot therefore be sufficiently improved in some cases.

Further, when the lengths of the DC periods are both decreased, the thermal load applied to the first electrode 92 in the first DC period DC1 decreases and the range over which the protrusion 552p is melted therefore narrows, and the amount of decrease in the temperature of the first electrode 92 in the second DC period DC2 decreases because the length td2 of the second DC period DC2 also decreases. Therefore, the melted protrusion 552p is successively unlikely to solidify, and the protrusion 52p is unlikely to grow in such a way that it piles up from the base thereof. As a result, the front end of the protrusion 552p is flattened in some cases. Arc jump therefore occurs, and the life of the discharge lamp 90 cannot be sufficiently improved in some cases.

In contrast, according to the present embodiment, the control unit 40 increases one of the length td1 of the first DC period DC1 and the length td2 of the second DC period DC2 but decreases the other one of the length td1 of the first DC period DC and the length td2 of the second DC period DC2. Therefore, when the protrusion 552p of the first electrode 92 is melted with the length td1 of the first DC period DC1 increased, the length td2 of the second DC period DC2 is decreased. As a result, the amount of decrease in the temperature of the first electrode 92 in the second DC period DC2 can be decreased, whereby the protrusion 552p of the first electrode 92 can be melted in a preferable manner. The protrusion 552p can therefore be likely to grow in a preferable manner.

When the protrusion 552p of the first electrode 92 is allowed to grow with the length td1 of the first DC period DC1 decreased, the length td2 of the second DC period DC2 is increased. As a result, the amount of decrease in the temperature of the first electrode 92 in the second DC period DC2 can be increased, whereby the melted protrusion 552p is allowed to successively solidify in a preferable manner. The protrusion 552p is therefore likely to have a sharply pointing front end, whereby occurrence of arc jump can be suppressed. The same holds true for the second electrode 93. According to the present embodiment, while the protrusion 552p of the first electrode 92 is melted, the protrusion 562p of the second electrode 93 can be shaped and grown, and while the protrusion 562p of the second electrode 93 is melted, the protrusion 552p of the first electrode 92 can be shaped and grown.

As described above, according to the present embodiment, the first electrode 92 and the second electrode 93 are both allowed to grow in a preferable manner, and the protrusions 552p and 562p are readily so shaped as to have preferable sharply pointing front ends. As a result, occurrence of arc jump can be suppressed, and the life of the discharge lamp 90 can be improved.

Further, according to the present embodiment, the first period AC, in which AC current having a frequency higher than 1 kHz is supplied to the discharge lamp 90, is provided between the first DC period DC1 and the second DC period DC2. The first period AC therefore serves as a buffer period, whereby the amount of stimulus resulting from a change in the thermal load applied to the electrodes can be reduced, as compared with a case where the first DC period DC1 is seamlessly switched to the second DC period DC2. The protrusions 552p and 562p can therefore be shaped in a more preferable manner. If the length ta of the first period AC is too long, the amount of decrease in the temperature of each of the electrodes increases in the first period AC, and the above-mentioned effect of shaping the protrusions 552p and 562p is not provided in a preferable manner in some cases. The length ta of the first period AC is preferably, for example, roughly longer than or equal to one cycle of the AC current supplied to the discharge lamp 90 but shorter than or equal to five cycles thereof, particularly preferably one cycle. Further, if the frequency of the AC current supplied to the discharge lamp 90 in the first period AC is too low, the amount of decrease in the temperature of each of the electrodes increases in the first period AC, and the effect of shaping the protrusions 552p and 562p is unlikely to be provided in a preferable manner in some cases. The frequency of the AC current in the first period AC is preferably higher than 1 kHz. Setting the length ta of the first period AC as described above allows the buffer effect provided by providing the first period AC to be provided in a preferable manner and the effect of shaping the protrusions 552p and 562p to be provided in a preferable manner.

Further, according to the present embodiment, in each of the modulation drive periods VD, the total length td of the length td1 of the first DC period DC1 and the length td2 of the second DC period DC2 in each of the unit periods U is roughly constant. Therefore, in both the case in which the first DC period DC1 is increased and the case in which the second DC period DC2 is increased, the width of the change in the length of each of the DC period, can be set in the same manner. As a result, the protrusion 552p of the first electrode 92 and the protrusion 562p of the second electrode 93 are both allowed to grow in a satisfactorily balanced manner.

Further, for example, when the discharge lamp 90 is degraded, the protrusion 552p of the first electrode 92 is unlikely to melt. Therefore, even when the same thermal load as that before the discharge lamp 90 is degraded is applied to the first electrode 92, the protrusion 552p is unlikely to grow.

In contrast, according to the present embodiment, the control unit 40 changes the total length td in accordance with the lamp voltage V1a. The thermal load applied to the first electrode 92 in each of the modulation drive periods VD can therefore be changed in accordance with the degree of degradation of the discharge lamp 90. As a result, increasing the total length td when the lamp voltage V1a increases, as in the present embodiment, allows the protrusion 552p to grow in a preferable manner even when the discharge lamp 90 is degraded. The life of the discharge lamp 90 can therefore be further improved.

Further, according to the present embodiment, the control unit 40 changes the length tv of the modulation drive periods VD in accordance with the lamp voltage V1a. The thermal load applied to the first electrode 92 in each of the modulation drive periods VD can therefore be changed in accordance with the degree of degradation of the discharge lamp 90. As a result, increasing the length tv of the modulation drive periods VD when the lamp voltage V1a increases, as in the present embodiment, allows the protrusion 552p to grow in a preferable manner even when the discharge lamp 90 is degraded. The life of the discharge lamp 90 can therefore be further improved.

Further, according to the present embodiment, the control unit 40 changes the parameters in the modulation drive periods VD in accordance with the lamp voltage V1a in the low-power drive, as described above e Since the drive power Wd supplied to the discharge lamp 90 in the low-power drive is lower than that in the rated-power drive, the protrusion 552p of the first electrode 92 is particularly unlikely to melt when the discharge lamp 90 is degraded, and the protrusion 552p is therefore unlikely to grow. The above-mentioned effect provided by the change in the parameters in the modulation drive periods VD according to the lamp voltage V1a is particularly significant in the low-power drive.

Further, according to the present embodiment, the control unit 40 repeats the modulation drive period VD with the predetermined gap therebetween. Therefore, when the shape of the protrusion 552p deteriorates during any of the steady drive periods SD, the modulation drive period VD is so inserted that the protrusion 552p can be shaped with application of excessive thermal load to the first electrode 92 suppressed. As a result, the Modulation drive periods VD can be readily provided in a preferable manner, and the life of the discharge lamp 90 can be further improved.

Further, in a case where the drive power Wd is relatively low, for example, the shape of the protrusion 552p is unlikely to deteriorate and the amount of wastage of the protrusion 552p is therefore small, as compared with a case where the drive power Wd is relatively high. In this case, providing the modulation drive periods VD as in the case where the drive power Wd is relatively high undesirably causes the protrusion 552p to excessively melt and grow in some cases, resulting in wastage of the protrusion 552p as opposed to the intended purpose.

In contrast, according to the present embodiment, the control unit 40 increases the gap between the modulation drive periods VD when the drive power Wd decreases. The frequency at which the modulation drive periods VD are provided can therefore be appropriately set in accordance with the magnitude of the drive power Wd, that is, the degree of deterioration (degree of wastage) of the protrusion 552p in any of the steady drive periods SD. The protrusion 552p is therefore allowed to grow in a preferable manner in accordance with the drive power Wd, whereby the life of the discharge lamp 90 can be further improved.

Further, for example, when the drive power Wd is relatively high, the thermal load applied to the first electrode 92 is relatively large, and the protrusion 552p therefore excessively melts in the modulation drive periods VD in some cases. On the other hand, when the drive power Wd is relatively low, the thermal load applied to the first electrode 92 is relatively small, and the protrusion 552p cannot therefore melt in a preferable manner in the modulation drive periods VD in some cases.

In contrast, according to the present embodiment, the control unit 40 increases the width of the change in or the width between the maximum and the minimum of the length td1 of the first DC period DC1 and the width of the change in or the width between the maximum and the minimum of the length td2 of the second DC period DC2 by a greater amount when lower drive power Wd is supplied. Therefore, when the drive power Wd is relatively high, the width of the change in or the width between the maximum and the minimum of the magnitude of the thermal load in each of the DC periods can be reduced, whereby a situation in which the protrusion 552p excessively melts can be avoided. When the drive power Wd is relatively low, the width of the change in or the width between the maximum and the minimum of the magnitude of the thermal load in each of the DC periods can be increased, whereby the stimulus resulting from the change in the thermal load applied to the first electrode 92 can be increased. As a result, even when the drive power Wd is relatively low, the protrusion 552p is allowed to melt in a preferable manner in the modulation drive periods VD. The life of the discharge lamp 90 can therefore be further improved.

In the present embodiment, the following configurations and methods can be employed.

The modulation drive period VD may be provided, for example, in a rising period that occurs when the discharge lamp 90 is turned on. The modulation drive period. VD may be provided only once whenever the discharge lamp 90 is turned on. Further, the drive cycle C, which forms each of the modulation drive periods VD, may be changed whenever the drive cycle C is provided. The lengths of the modulation periods that form the drive cycle C may differ from each other.

The total length td, which is the combination of the length td1 of the first DC period DC1 and the length td2 of the second DC period DC2 in each of the unit periods U, is not necessarily constant. The total length td may, for example, is changed whenever the unit period U is provided.

The changes in the parameters in each of the modulation drive periods VD according to the lamp voltage V1a may be made in the rated-power drive, may be made in both the rated-power drive and the low-power drive, or may not be made in the rated-power drive or the low-power drive. Further, the changes in the parameters in each of the modulation drive periods VD according to the drive power Wd may not be made.

Further, in the present embodiment, the duration ratio DR between the DC periods in each of the modulation drive periods VD changes in a sinusoidal manner in one drive cycle C, but not necessarily. The duration ratio DR may, for example, change in a linear or parabolic manner.

Further, in the present embodiment, the drive current I supplied to the discharge lamp 90 alternately has the steady drive period SD and the modulation drive period VD, but not necessarily. For example, the control unit 40 may provide, at a predetermined timing, a low-frequency period in which AC current having a frequency lower than the frequency of the AC current supplied to the discharge lamp 90 in each of the steady drive periods SD (lower than or equal to 150 Hz, for example is supplied to the discharge lamp 90.

Second Embodiment

Figure 11:
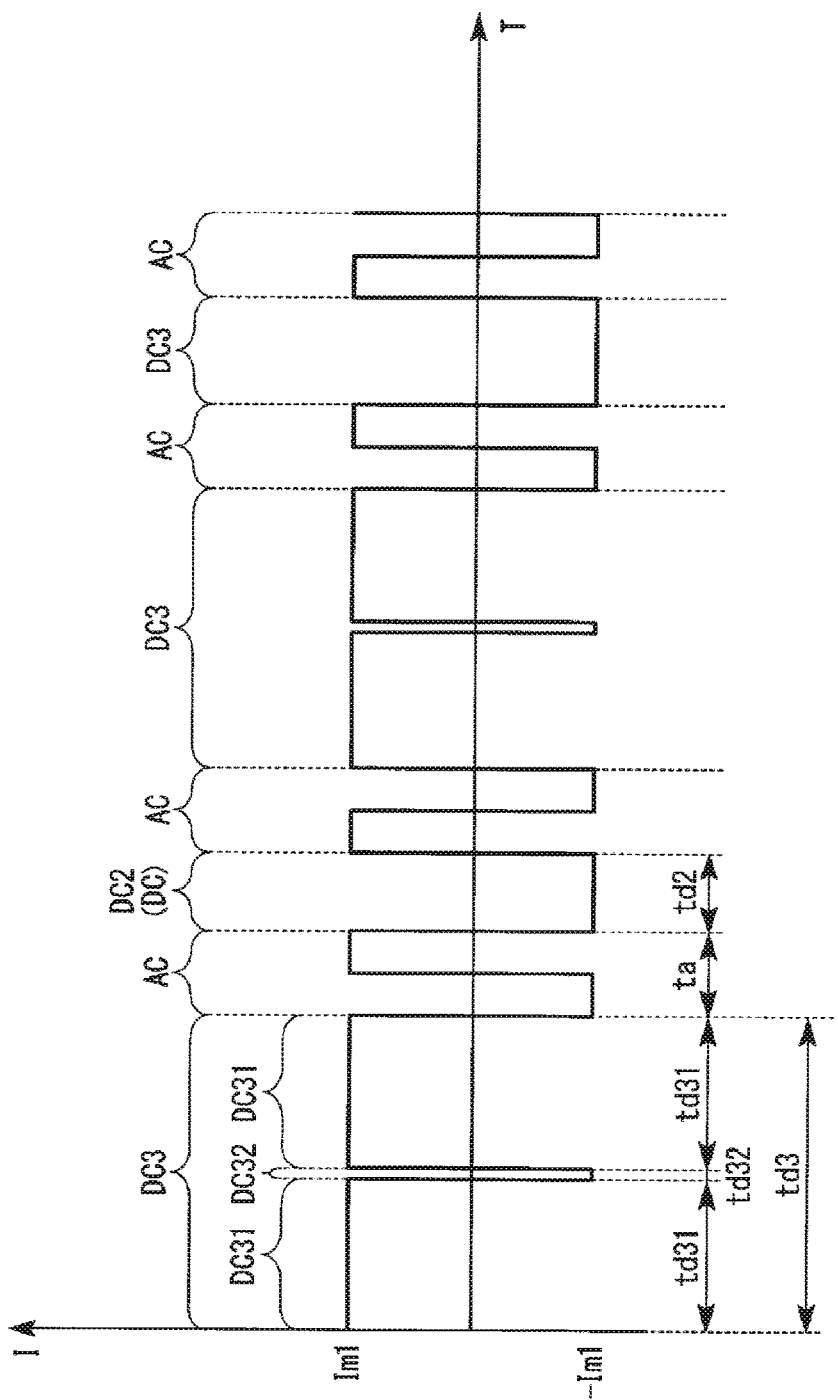
FIG. 11 shows an example of the drive current supplied to the discharge lamp in the modulation drive period in a second embodiment.

A second embodiment differs from the first embodiment in that a third period DC3 is provided. FIG. 11 shows an example of the drive current I supplied to the discharge lamp 90 in each of the modulation drive periods VD in the present embodiment. In FIG. 11, the vertical axis represents the drive current I, and the horizontal axis represents the time T. The same configurations as those in the embodiment described above, for example, have the same reference characters as appropriate and will not be described in some cases.

In the present embodiment, the control unit 40 controls the discharge lamp driver 230 in such a way that in a case where the length of the second period DC is greater than a predetermined value, the second period DC is replaced with the third period DC3 shown in FIG. 11. The example shown in FIG. 11 shows a case where only the first DC period DC1 of the second period DC is replaced with the third period DC3. The predetermined value is, for example, 20 ms (milliseconds).

The third period DC3 is a period alternately containing a first polarity period DC31 and a second polarity period DC32. The first polarity period DC31 is a period in which DC current is supplied to the discharge lamp 90. In the example shown in FIG. 11, in the first polarity period DC31, the first-polarity drive current I having the constant current value Im is supplied to the discharge lamp 90.

The second polarity period DC32 is a period in which DC current having the polarity opposite the polarity of the DC current supplied to the discharge lamp 90 in the first polarity period DC31 is supplied to the discharge lamp 90. In the example shown in FIG. 11, in the second polarity period DC32, the second-polarity drive current I having the constant current value −Im is supplied to the discharge lamp 90.

The length td31 of the first polarity period DC31 is longer than the length td32 of the second polarity period DC32. The length td31 of the first polarity period DC31 is, for example, at least 10 times the length td32 of the second polarity period DC32. Setting the length td31 of the first polarity period DC31 as described above allows one of the electrodes to be heated in a preferable manner and prevents the temperature of the other electrode from excessively decreasing in a preferable manner in the third period DC3.

The length td31 of the first polarity period DC31 is, for example, longer than or equal to 5 ms (milliseconds) but shorter than or equal to 20 ms (milliseconds). The length td32 of the second polarity period DC32 is shorter than 0.5 ms (milliseconds). The sum of the lengths td31 of the first polarity periods DC31 contained in the third period DC3 is equal to the length of the second period DC provided when it is not replaced with the third period DC3.

For example, in a case where the second period DC having a length so set to be greater than the predetermined value is provided in each of the modulation drive periods VD, the temperature of the electrode on the side opposite the electrode heated in the second period DC, for example, the second electrode 93, could excessively decreases.

In contrast, according to the present embodiment, in the case where the length td2 of the second period DC is greater than the predetermined value, the second period DC is replaced with the third period DC3 having the second polarity period DC32, in which DC current having the polarity opposite the polarity of the DC current supplied to the discharge lamp 90 in the first polarity period DC31 is supplied to the discharge lamp 90. Therefore, even in a case where the length td3 of the third period DC3 is increased, that is, even in a case where the sum of the lengths of the first polarity periods DC31 is increased, the second electrode 93 can be heated in the second polarity period DC32 in the third period DC3. As a result, the electrode heated in the third period DC3, for example, the first electrode 92, can be sufficiently heated, and the situation in which the temperature of the second electrode 93 on the side opposite the first electrode 92 excessively lowers can be avoided.

In the embodiments described above, the description has been made with reference to the case where the invention is applied to a transmissive projector, and the invention is also applicable to a reflective projector. The term "transmissive" means that the liquid crystal light valves each including a liquid crystal panel or any other component are of light transmissive type. The term "reflective" means that the liquid crystal light valves are of light reflective type. Each of the light modulators is not limited, for example, to a liquid crystal panel and may, for example, be a light modulator using a micromirror.

In the embodiments described above, the projector 500 using the three liquid crystal panels 560R, 560G, and 560B (liquid crystal light valves 330R, 330G, and 330R) has been presented by way of example. The invention is also applicable to a projector using only one liquid crystal panel and a projector using four or more liquid crystal panels.

The configurations described in the above embodiments can be combined with one another to the extent that the combination causes no contradiction.

The entire disclosure of Japanese Patent Application No. 2016-151220, filed Aug. 1, 2017 is expressly incorporated by reference herein.

What is claimed is:
1. A discharge lamp driver comprising:
a discharge lamp driving unit configured to supply drive current to a discharge lamp including a first electrode and a second electrode; and
a control unit configured to control the discharge lamp driving unit,
wherein the drive current has a modulation drive period in which a first period and a second period are alternately repeated, the first period in which AC current having a frequency higher than 1 kHz is supplied to the discharge lamp, the second period in which DC current is supplied to the discharge lamp,
wherein a polarity of the DC current supplied to the discharge lamp in the second period is inverted whenever the second period is provided, and
wherein in the modulation drive period, the control unit periodically changes length of a first DC period and length of a second DC period, the first DC period included in a plurality of the second periods and in which DC current of a first polarity is supplied to the discharge lamp, the second DC period included in the plurality of the second periods and in which DC current of a second polarity is supplied to the discharge lamp, and
increases one of the length of the first DC period and the length of the second DC period while decrease another of the length of the first DC period and the length of the second DC period.

2. The discharge lamp driver according to claim 1,
wherein in the modulation drive period, a unit period containing one first DC period and one second DC period is repeated, and in the modulation drive period, total length of the length of the first DC period and the length of the second DC period in each unit period is roughly constant.

3. The discharge lamp driver according to claim 2, further comprising a voltage detector configured to detect inter-electrode voltage of the discharge lamp,
wherein the control unit changes the total length in the modulation drive period in accordance with the detected inter-electrode voltage.

4. The discharge lamp driver according to claim 3, wherein the control unit increases the total length in the modulation drive period in accordance with increase of the detected inter-electrode voltage.

5. A projector comprising:
a discharge lamp configured to emit light;
the discharge lamp driver according to claim 4;
a light modulator configured to modulate the light emitted from the discharge lamp in accordance with an image signal; and
a projection system configured to project the light modulated by the light modulator.

6. The discharge lamp driver according to claim 3, wherein the control unit
performs a first drive operation in which first drive power is supplied to the discharge lamp and a second drive operation in which second drive power lower than the first drive power is supplied to the discharge lamp, and
in the second drive operation, changes the total length in the modulation drive period in accordance with the detected inter-electrode voltage.

7. A projector comprising:
a discharge lamp configured to emit light;
the discharge lamp driver according to claim 6;
a light modulator configured to modulate the light emitted from the discharge lamp in accordance with an image signal; and
a projection system configured to project the light modulated by the light modulator.

8. A projector comprising:
a discharge lamp configured to emit light;
the discharge lamp driver according to claim 3;
a light modulator configured to modulate the light emitted from the discharge lamp in accordance with an image signal; and
a projection system configured to project the light modulated by the light modulator.

9. A projector comprising:
a discharge lamp configured to emit light;
the discharge lamp driver according to claim 2;
a light modulator configured to modulate the light emitted from the discharge lamp in accordance with an image signal; and
a projection system configured to project the light modulated by the light modulator.

10. The discharge lamp driver according to claim 1, further comprising a voltage detection unit configured to detect inter-electrode voltage of the discharge lamp,
wherein the control unit changes length of the modulation drive period in accordance with the detected inter-electrode voltage.

11. The discharge lamp driver according to claim 10, wherein the control unit increases the length of the modulation drive period in accordance with increase of the detected inter-electrode voltage.

12. A projector comprising:
a discharge lamp configured to emit light;
the discharge lamp driver according to claim 11;
a light modulator configured to modulate the light emitted from the discharge lamp in accordance with an image signal; and
a projection system configured to project the light modulated by the light modulator.

13. The discharge lamp driver according to claim 10, wherein the control unit
performs a first drive operation in which first drive power is supplied to the discharge lamp and a second drive operation in which second drive power lower than the first drive power is supplied to the discharge lamp, and
in the second drive operation, changes the length of the modulation drive period in accordance with the detected inter-electrode voltage.

14. A projector comprising:
a discharge lamp configured to emit light;
the discharge lamp driver according to claim 10;
a light modulator configured to modulate the light emitted from the discharge lamp in accordance with an image signal; and
a projection system configured to project the light modulated by the light modulator.

15. The discharge lamp driver according to claim 1, wherein the control unit repeats the modulation drive period with a predetermined, gap between the repeated modulation drive periods.

16. The discharge lamp driver according to claim 15, wherein the control unit increases length of the predetermined gap in accordance with decrease of drive power supplied to the discharge lamp.

17. The discharge lamp driver according to claim 1, wherein the control unit increases a width of a change between a maximum and a minimum of the length of the first DC period and a width of a change between a maximum and a minimum of the length of the second DC period in accordance with decrease of drive power supplied to the discharge lamp.

18. The discharge lamp driver according to claim 1, wherein the control unit controls the discharge lamp driving unit in such a way that the second period is replaced with a third period in a case where length of the second period is greater than a predetermined value,
wherein the third period alternately contains a first polarity period in which DC current is supplied to the discharge lamp and a second polarity period in which DC current having a polarity opposite a polarity of the DC current supplied to the discharge lamp in the first polarity period is supplied to the discharge lamp,
wherein length of the first polarity period is greater than length of the second polarity period, and
wherein the length of the second polarity period is smaller than 0.5 ms.

19. A projector comprising:
a discharge lamp configured to emit light;
the discharge lamp driver according to claim 1;
a light modulator configured to modulate the light emitted from the discharge lamp in accordance with an image signal; and
a projection system configured to project the light modulated by the light modulator.

20. A discharge lamp driving method for supplying drive current to a discharge lamp and driving the discharge lamp including a first electrode and a second electrode, the method comprising:

supplying the discharge lamp with the drive current having a modulation drive period in which a first period and a second period are alternately repeated, the first period in which AC current having a frequency higher than 1 kHz is supplied to the discharge lamp, the second period in which DC current is supplied to the discharge lamp;

inverting a polarity of the DC current supplied to the discharge lamp in the second period whenever the second period is provided;

periodically changing, in the modulation drive period, length of a first DC period and length of a second DC period, the first DC period included in a plurality of the second periods and in which DC current of a first polarity is supplied to the discharge lamp, the second DC period included in the plurality of the second periods and in which DC current of a second polarity is supplied to the discharge lamp; and increasing, in the modulation drive period, one of the length of the first DC period and the length of the second DC period while decreasing another one of the length of the first DC period and the length of the second DC period.

* * * * *